Figure 1:
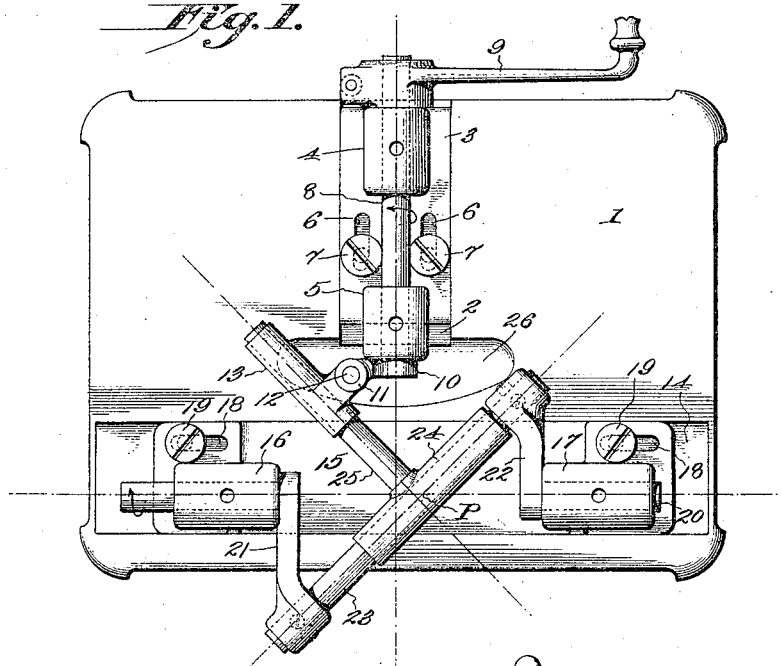

A. H. DE VOE.
MECHANICAL MOVEMENT.
APPLICATION FILED SEPT. 11, 1918.

1,306,104.

Patented June 10, 1919.
2 SHEETS—SHEET 1.

WITNESSES:

INVENTOR
A. H. DeVoe,
BY
ATTORNEY

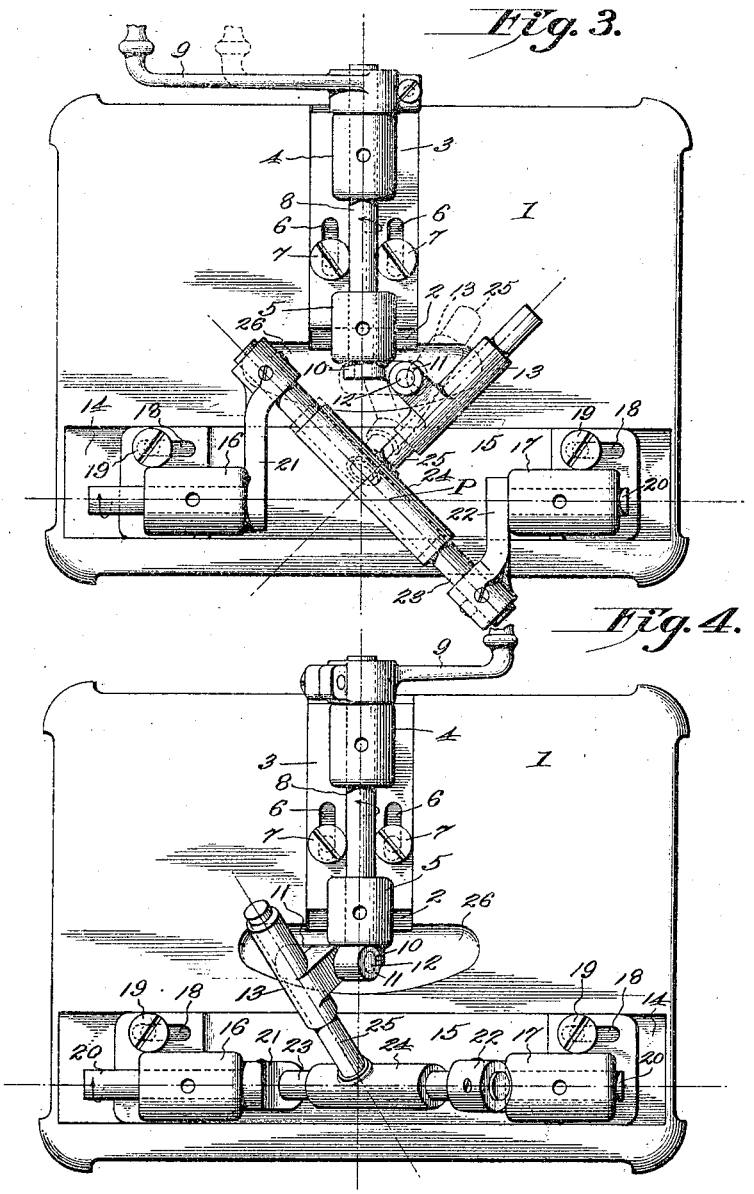

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

MECHANICAL MOVEMENT.

1,306,104.  Specification of Letters Patent.  Patented June 10, 1919.

Application filed September 11, 1918. Serial No. 253,548.

*To all whom it may concern:*

Be it known that I, ALBERT H. DE VOE, a citizen of the United States, residing at Westfield, in the county of Union and State of New Jersey, have invented certain new and useful Improvements in Mechanical Movements, of which the following is a specification, reference being had therein to the accompanying drawings.

This invention relates to an improvement in mechanisms for imparting a variable motion to a driven element from a constantly rotating driving element, and has for its primary object to provide a simple but effective mechanism of this character.

In the preferred embodiment of the present invention, which is a modification of that disclosed in my prior Patent No. 1,231,136, dated June 26, 1917, a driving shaft receives a constant rotary motion by means of a hand-operated crank or from any other suitable source. One end of the driving shaft carries a yoke provided with spaced ears for a pivot pin upon which is fulcrumed a driving crank-element inclined to the axis of the driving shaft. Slidingly fitted to the driving crank-element is a coöperating driven crank-element projecting substantially at right angles from a driven crank-sleeve slidingly mounted upon an elongated shaft-crank, secured upon oppositely directed radial arms of the driven shaft and preferably inclined at an angle of approximately 45° to the axis of the driven shaft. The driving shaft is arranged substantially at right angles to the driven shaft and in the present instance is laterally offset so that its axis intersects the driven shaft-crank at a point to one side of the intersection of the center line of said shaft-crank with the axis of the driving shaft.

By relatively offsetting the shaft-cranks in this manner the point of application of the driving force is at a constantly varying distance from the point of intersection referred to, due to the sliding action of the driven-shaft crank-sleeve. The resulting action is such that there is imparted to the driven shaft a variable rotary motion having either an approximate dwell or a slight reverse motion at a certain point. The degree of reverse motion is determined by the extent of relative lateral adjustment of the driving and driven crank-elements.

In the accompanying drawings, Figures 1 to 4, inclusive, are plan views of the present modification of the mechanism disclosed and described in my prior patent No. 1,231,136, hereinbefore referred to. In the position illustrated in Fig. 1 the axes of the driving and driven shaft-cranks lie in substantially a horizontal plane and the succeeding figures illustrate positions in which the axis of the driven shaft is advanced 90° in each consecutive figure during a rotation the direction of which is indicated by arrows.

Referring to the drawings, the present embodiment of the invention comprises a base 1 formed with a slideway 2 upon which is adjustably secured a bearing bracket 3, having spaced bearings 4 and 5 and provided with elongated apertures as 6, entered by the securing screws as 7. Journaled in the bearings 4 and 5 is a driving shaft 8 which may be driven by means of a hand-crank 9 or by any other form of driving means. Suitably secured upon one end of the driving shaft is a yoke in the form of a collar 10 provided with spaced ears, as 11, forming a bearing for a pivot-pin 12. Upon the pivot pin 12 is fulcrumed a crank-element in the present instance in the form of a tubular bearing 13 held inclined with respect to the axis of the driving shaft.

The base 1 is also formed with a slideway 14 extending transversely of the slideway 2 and in which is adjustably secured a bracket 15, having spaced bearings 16 and 17 and provided with elongated apertures, as 18, entered by the securing screws, as 19. Journaled in the bearings 16 and 17 is a driven shaft 20 extending substantially at right angles to the driving shaft 8 and provided with a crank comprising radial arms 21 and 22 and the intermediate crank-member 23 suitably secured thereto, said crank-member being preferably inclined at an angle of 45° to the axis of the driven shaft. Slidingly journaled upon the crank-member 23 is a crank-sleeve 24 having a power transmitting connection in the present instance in the form of a laterally projecting pin 25 slidingly fitted into the tubular bearing 13. The base 1 is shown as formed with a recess 26 to provide clearance for the pin 25.

As shown more particularly in Figs. 1 and 3 of the drawings, the axis of the driven shaft and the center line of its crank-member intersect at a point P. In the construction of my prior patent No. 1,231,136 and as clearly set forth therein, the axis of the driving shaft also intersected this point P at all times, the adjustments provided being along the line of the axis of the driving shaft. According to the present improved construction an additional adjustment is provided to offset the axis of the driving shaft laterally from the point P. This adjustment radically changes the character of drive imparted to the driven shaft from an oscillating motion to a variable rotary motion which will now be described.

During a continuous rotation of the driving shaft the direction of rotation of the driven shaft is dependent upon which side of the point P and in which direction the active component of force operates.

It is obvious that a force expended closely adjacent this point P has a greater rotating action than the same force acting farther from said point due to the increasing arc of movement as the force is applied at an increasing distance from said point. Now by laterally offsetting the driving shaft from said point P, the speeds of the driving and driven cranks are constantly varying relatively for due to the consequent sliding action of the driven crank-sleeve the application of the active component of force is at a constantly varying distance from said point. This variable rotary motion may obviously be increased or decreased by varying the offset position of the driving shaft with respect to the intersection point referred to.

Taking into consideration the positions indicated in the several figures of the drawings, the application of the active component of force in Fig. 1 is closely adjacent the intersection point P and to the left thereof. The driving shaft rotating in the direction indicated by an arrow, the active component of force bears upwardly upon the crank and causes the driven crank to rotate in the direction indicated by an arrow and with an accelerated velocity. As the driven crank moves from the position indicated in Fig. 1, the driven crank-sleeve gradually slides longitudinally away and to the left from the point P reaching its maximum movement just before the driven crank reaches its horizontal position shown in dotted lines in Fig. 3. From an inspection of the figures from 1 to 2 the driving crank rotates substantially only 45° while the driven crank rotates 90°.

Figure 2:
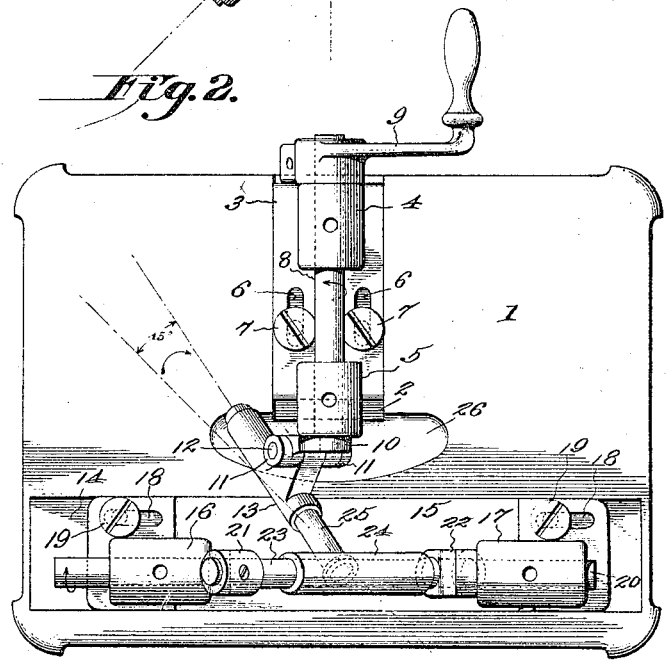

During the next quarter of a revolution of the driven crank, that is from the position indicated in Fig. 2 to that shown in dotted lines in Fig. 3, the driven crank-sleeve has moved so far to the left away from the point P as to slow up the effect of the driving force and consequently the driving member also rotates approximately 90° during this time. At this point of revolution of the driven shaft, its crank-sleeve commences a return sliding movement to the right. But at this time the driving crank is rising and the active component of force changes from a downward one upon the driven crank bearing to the left of the point P to an upward one on the same side. Consequently the direction of rotation of the driven shaft is reversed for a very short distance until the driving crank has passed its horizontal position and approaches its vertical position. The driven crank-sleeve then again commences to slide to the left and the active component of force again bears downwardly upon the driven crank to the left of the point P and the driven shaft therefore resumes its direction of rotation. During this reversal movement of the driven shaft the driving shaft rotates substantially 45° and therefore during the time that the driven shaft rotates from the position shown in Fig. 2 to that shown in full lines in Fig. 3, the driving shaft rotates substantially 135°. The closer the axis of the driven shaft is adjusted to the point P, the less reverse movement is obtained and thereby a dwell is approximated.

As the driving crank passes its vertical position, that is, the vertical position it attains between the positions indicated in Figs. 3 and 4, the driven crank-sleeve commences to slide to the right and both cranks perform substantially a quarter of a revolution during the same time. The driving and driven cranks are now substantially in the position indicated in Fig. 4. As the application of the active component of force gradually approaches the point P, the driving action is of course multiplied and consequently the driven crank rotates from the position indicated in Fig. 4 to that shown in Fig. 1, or 90°, while the driving crank rotates only 45°. This completes the rotation of the shafts for one cycle.

Having thus set forth the nature of the invention, what I claim herein is:—

1. In a mechanical movement, in combination, a driving shaft and a driven shaft each provided with a crank-member whose axis is inclined to the axis of its shaft, an operative connection between and sustained solely by said crank-members adapted to positively rotate the driven shaft in a direction determined by the direction of rotation of the driving shaft and at accelerated and retarded speeds with respect to the speed of said driving shaft.

2. In a mechanical movement, in combination, a driven shaft provided with a crank inclined to its axis so as to intersect the same, a driving shaft, and means for transmitting variable rotary movements from said driving shaft to said driven shaft including an operative connection therebetween providing an active component of force operating throughout each revolution at varying distances from the point of intersection of the center line of said crank with the axis of the driven shaft.

3. In a mechanical movement, in combination, a driving shaft and a driven shaft, arranged substantially at right angles with respect to each other, and an operative connection between said shafts including a plurality of crank-members adapted to transmit variable complete rotary movements to said driven shaft from a driving shaft rotating at a substantially uniform speed.

4. In a mechanical movement, in combination, a rotary driving shaft, a driven shaft whose axis intersects the axis of the driving shaft substantially at right angles, an inclined crank member provided on said driven shaft having the point of intersection of its center line with the axis of said driven shaft laterally offset from the point of intersection of the axes of said shafts, and means for operatively connecting said driving shaft with said crank-member for transmitting to said driven shaft variable rotary movements.

5. In a mechanical movement, in combination, a driving shaft, a driven shaft and an operative connection between said shafts adapted to transmit to said driven shaft during each revolution of the driving shaft a complete revolution and an additional oscillation on its axis of revolution.

6. In a mechanical movement, in combination, a driving shaft and a driven shaft each provided with a crank inclined with respect to its axis, and an operative connection between said cranks adapted to transmit to said driven shaft during each revolution of the driving shaft a complete revolution and a slight oscillation approximating a dwell.

7. In a mechanical movement, in combination, a driven shaft provided with an inclined crank whose center line intersects the axis of said shaft at a point forming the vertex of an acute angle, a crank-member slidingly mounted upon said crank, a driving shaft, and an operative connection between said crank-member and said driving shaft adapted to rotate the driven shaft and reciprocate said crank-member upon the driven-shaft crank toward and from said point of intersection.

8. In a mechanical movement, in combination, a driving shaft, a driven shaft and driving connections between said shafts including a crank on one of said shafts whereby one of said shafts revolves a greater distance than one complete revolution during the time the other shaft rotates one complete revolution.

In testimony whereof I have signed my name to this specification.

ALBERT H. DE VOE.

Copies of this patent may be obtained for five cents each, by addressing the "Commissioner of Patents, Washington, D. C."